US012199391B2

(12) United States Patent
Vonach

(10) Patent No.: US 12,199,391 B2
(45) Date of Patent: Jan. 14, 2025

(54) CONNECTION EXPANSION MODULE

(71) Applicant: Tridonic GmbH & Co KG, Dornbirn (AT)

(72) Inventor: Christoph Vonach, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 324 days.

(21) Appl. No.: 17/635,816

(22) PCT Filed: Sep. 3, 2020

(86) PCT No.: PCT/EP2020/074612
§ 371 (c)(1),
(2) Date: Feb. 16, 2022

(87) PCT Pub. No.: WO2021/043910
PCT Pub. Date: Mar. 11, 2021

(65) Prior Publication Data
US 2022/0311195 A1 Sep. 29, 2022

(30) Foreign Application Priority Data
Sep. 3, 2019 (DE) ..................... 20 2019 104 836.0

(51) Int. Cl.
*H01R 31/02* (2006.01)
*F21V 23/06* (2006.01)
(Continued)

(52) U.S. Cl.
CPC ............. *H01R 31/02* (2013.01); *F21V 23/06* (2013.01); *H01R 9/2491* (2013.01); *H01R 31/06* (2013.01)

(58) Field of Classification Search
CPC ..... F21V 23/06; H01R 13/621; H01R 9/2491; H01R 31/06; H01R 31/02
See application file for complete search history.

(56) References Cited

U.S. PATENT DOCUMENTS 6,945,806 B1 * 9/2005 Hsieh ..................... H01R 35/02 439/351
9,755,386 B2 * 9/2017 Moser ...................... H01R 4/64
(Continued)

FOREIGN PATENT DOCUMENTS

CN 202616492 12/2012
DE 199 17 138 3/2001
(Continued)

OTHER PUBLICATIONS

PCT/EP2020/074612, International Search Report and Written Opinion dated Nov. 3, 2020, 19 pages and English Translation, 6 pages.

*Primary Examiner* — Marcus E Harcum
(74) *Attorney, Agent, or Firm* — Andrus Intellectual Property Law, LLP

(57) ABSTRACT

The invention relates to a connection expansion module (2) for a component (1) of a lighting system, having a securing means (22 . . . 25, 29) for securing the connection expansion module to the component, at least one contact element (7 . . . 10) for contacting an electric connection (L, N, S1, S2) of the component (1), and multiple connections (12 . . . 19) connected to the contact element (7 . . . 10) in order to connect electric lines to the connection expansion module (2).

9 Claims, 2 Drawing Sheets

(51) Int. Cl.
*H01R 9/24* (2006.01)
*H01R 31/06* (2006.01)

(56) References Cited

U.S. PATENT DOCUMENTS

| | | | | |
|---|---|---|---|---|
| 11,219,108 | B1 * | 1/2022 | King | H05B 47/19 |
| 2013/0183779 | A1 * | 7/2013 | Pachler | F21V 21/002 362/249.02 |
| 2016/0380550 | A1 | 12/2016 | Wang | |
| 2018/0177023 | A1 * | 6/2018 | Li | H03K 17/945 |
| 2018/0359830 | A1 * | 12/2018 | Wang | H05B 39/044 |
| 2021/0278071 | A1 * | 9/2021 | Tiefel | F21S 2/005 |

FOREIGN PATENT DOCUMENTS

| | | | | |
|---|---|---|---|---|
| DE | 100 53 302 | | 10/2001 | |
| FR | 3038150 | A1 * | 12/2016 | H01R 33/94 |
| WO | WO-2015109351 | A1 * | 7/2015 | H01R 13/52 |

* cited by examiner

CONNECTION EXPANSION MODULE

CROSS REFERENCE TO RELATED APPLICATIONS

The present application is the U.S. national stage application of international application PCT/EP2020/074612 filed Sep. 3, 2020, which international application was published on Mar. 11, 2021 as International Publication WO 2021/043910 A1. The international application claims priority to German Patent Application 20 2019 104 836.0 filed Sep. 3, 2019.

FIELD OF THE INVENTION

The present invention relates to a module for expanding the connection possibilities of components in a lighting system.

BACKGROUND OF THE INVENTION

Components of lighting systems, such as operating devices for illuminants, sensors, actuators, switches, or dimmers, should generally be designed as compactly as possible or require little space at the installation location. In addition, the components should cover many possible applications, in order to reduce the number of components with different functional scope.

Operating devices primarily serve to provide a power supply for the illuminant, such as a light-emitting diode (LED or OLED) or multiple light-emitting diodes connected in series and/or in parallel. Additional functions, such as dimming of the illuminant, the change/adjustment of the light color, the measurement and output of the power consumption, or the specification of the illumination intensity and illumination duration in emergency light operation (I-SELECT), can be provided in the operating device. Operating devices with such additional functions usually have a greater number of connections compared to simple operating devices. However, the number of connections also increases if connections are provided in duplicate at components in order to enable a loop-through of signal lines and/or supply lines to another, downstream component, and thus to reduce the installation expenditure with respect to the cables or junction boxes.

However, a high number of connections hinders a miniaturization of the component, in particular in the region of the connections. On the other hand, the provision of components with different connections is complex and expensive.

SUMMARY OF THE INVENTION

The invention is based on the object of specifying a device and a method which alleviate the described problems. The object is, in particular, to provide a connection expansion module and a system which allow a simple and cost-effective adaptation of the connections to different applications.

This object is achieved according to the features of the independent claims. The invention is developed by the features of the dependent claims.

According to the present invention, the connection expansion module for a component of a lighting system has securing means for securing the connection expansion module to the component, at least one contact element for contacting an electrical connection of the component, and multiple connections connected to the contact element for connecting electrical lines to the connection expansion module.

The two or more connections electrically connected to the contact element enable a signal line or supply line laid to the component to be looped through to another component, or the distribution or connection of a respective plurality of components located at different locations via a respective line. With the present invention it is also possible to change the connection type (e.g.: plug-in contact, spring terminal) and/or the size of the connection of the component contacted by the contact element, or to replace it with a different connection type (screw terminal) or another size. An enlargement of the connection enables the connection of a line with a larger cross section, which is necessary, for example, due to a large line length (reduction of the voltage drop through the line) or a low mains voltage.

he connection expansion module can be permanently secured to the component, for example by gluing or with another securing means. Alternatively, the securing means can be designed to secure the connection expansion module to the component so as to be releasable, in particular by a clicking or latching connection.

The connection expansion module can have at least one cover made of an electrically non-conductive material which is designed to cover the contact element, the connections of the connection expansion module, and/or the connections of the component secured to the connection expansion module, or to at least protect them from contact. The cover can replace a cover already present on the component, which cover is removable and protects the connections of the component.

The cover of the connection expansion module can be configured to facilitate securing the connection expansion module to the component in addition to the securing means.

The connection of the component can be a screw connection (screw terminal) or a spring terminal, wherein the contact element is designed to contact the electrical connection by means of a clamping or screw connection. The contact element can thereby in particular be a cylindrical pin, wire, or cable.

The connection expansion module can have at least two contact elements which are designed to respectively contact one electrical connection of the component in order to supply voltage, wherein at least two of the connections of the connection expansion module are electrically connected together to one of the at least two contact elements. The at least two connections of the component can be mains connections for the component or the connections for an illuminant.

Additionally or alternatively, the connection expansion module can have at least two contact elements which are designed to contact a respective electrical connection of the component for inputting and/or outputting a control or data signal, wherein at least two of the connections of the connection expansion module are electrically connected together to one of the at least two contact elements.

The type and size of the connections of the component contacted by the connection expansion module can be different, wherein the contact elements are designed accordingly in order to contact the different connections.

In some applications, a strain relief is provided on the component for the cables (connection lines), which strain relief is intended to prevent the connection lines from tearing out and to protect the connections from mechanical stress via the lines. This function can be retrofitted in a simple manner with the connection expansion module. For this purpose, the connection expansion module has means for strain relief for the electrical lines that can be connected to the connection expansion module.

According to the present invention, a system has the component of the lighting system and one of the described connection expansion modules.

The component can be an operating device for operating one or more illuminants, in particular LEDs, or a sensor.

BRIEF DESCRIPTION OF THE DRAWINGS

The invention is explained in more detail in the following using the accompanying drawings. The following are shown.

Components with the same functions are identified by the same reference signs in Figures.

DETAILED DESCRIPTION

According to the present invention, the number and/or the type of connections of a component of a lighting system can be adapted to an application by means of a special module for which the connections of the component are otherwise not suitable.

Figure 1:
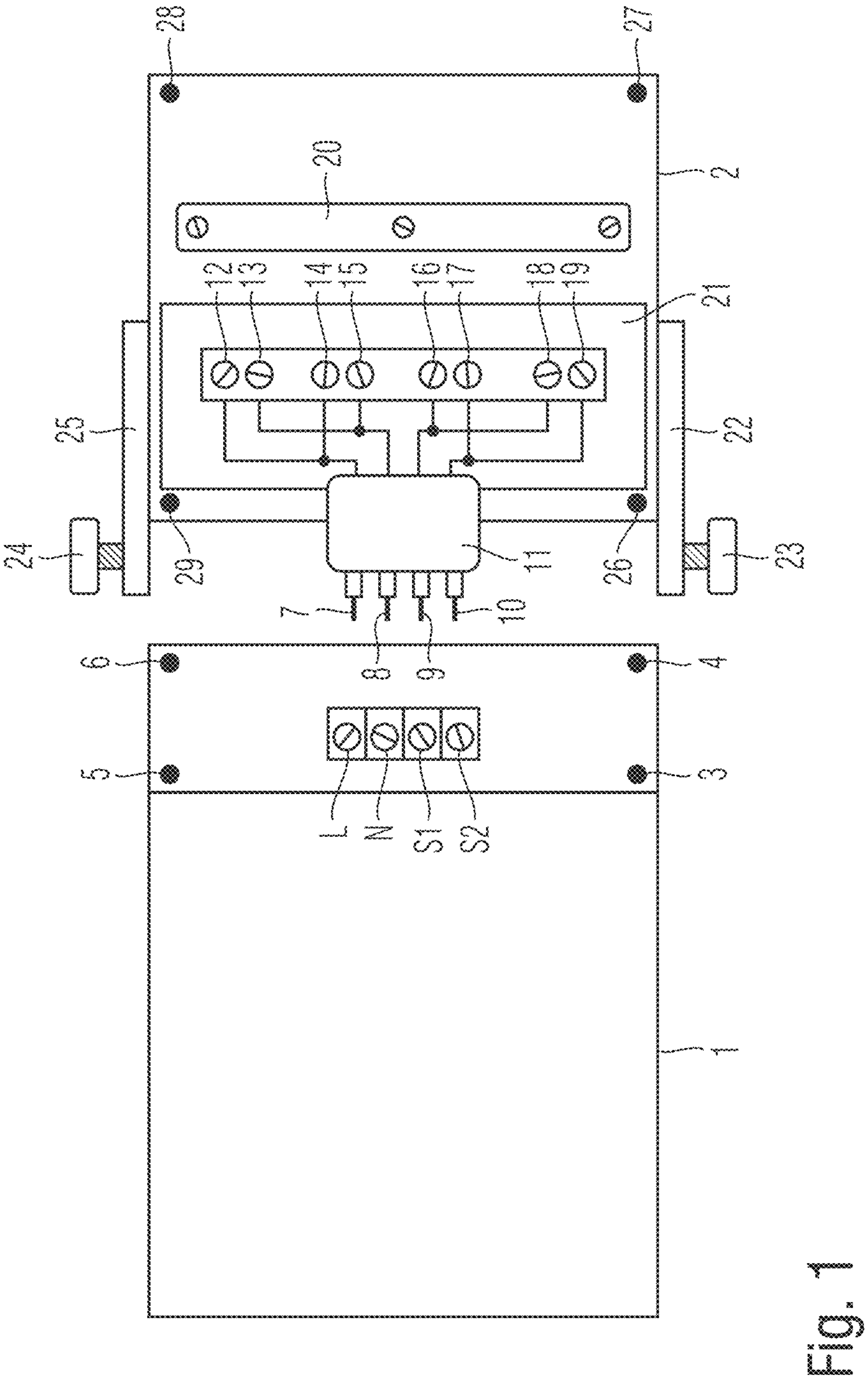
FIG. 1 a plan view of a component of a lighting system and a connection expansion module, which is separate from the component, according to an exemplary embodiment according to the present invention, and FIG. 2 a side view of the system shown in FIG. 1, in the assembled state.

FIG. 1 shows a component 1 of a lighting system which has four connections L, N, S1, S2, and can be an operating device for illuminants, a presence sensor, or a dimming sensor, and a connection expansion module 2 for this component 1 in a view from above. The four connections L, N, S1, S2 are respectively designed as a screw terminal, wherein the connections L, N are input connections and serve for connecting a supply line for the voltage supply of the component 1, and the connections S1, S2 are output connections and serve for connecting a signal line or a connecting line to an illuminant. Alternatively, the connections S1, S2 can be provided for connecting a two-wire DALI line, by means of which control and/or status signals are transmitted between the components of the lighting system.

The connection expansion module 2 serves for the duplication of the four connections L, N, S1, S2 so that the supply line can be looped through the connection expansion module 2 to another component of the lighting system and two signal lines or two connection lines can be connected.

The parts of the component 1 are located in a housing, wherein the four connections L, N, S1, S2 are protected from contact with a removable cover. In the example shown in FIG. 1, the cover is removed so that the threaded bores 3 . . . 6 provided for mounting the cover and the four connections L, N, S1, S2 are visible.

The connection expansion module 2 has four contact elements 7 . . . 10; a holding element 11 on which the four contact elements 7 . . . 10 are attached; eight connections 12 . . . 19 designed as screw terminals for connecting the two supply lines and the two signal lines or the two connection lines; a strain relief 20 for the mentioned lines; a printed circuit board 21; securing means 22 . . . 25 for securing the connection expansion module 2 to the component; and a removable cover which closes the upper part of the housing of the connection expansion module 2. In the example shown in FIG. 1, the cover of the connection expansion module 2 is also removed so that the threaded bores 26 . . . 29 provided for mounting the cover are visible.

Located on the printed circuit board 21 are the eight connections 12 . . . 19 and conductor traces, which establish an electrical connection from the contact element 7 to the connections 12 and 14, an electrical connection from the contact element 8 to the connections 13 and 15, an electrical connection from the contact element 9 to the connections 16 and 18, and an electrical connection from the contact element 10 to the connections 17 and 19.

The securing means 22 . . . 25 has two guide rails 22, 25 and two screws 23, 24 attached to the guide rails 22, 25. The guide rails 22, 25 are provided laterally on the connection expansion module 2 in order to position the four contact elements 7 . . . 10 with respect to the four connections L, N, S1, S2 in such a way that the four contact elements 7 . . . 10 can be inserted and screwed into the screw terminals of the four connections L, N, S1, S2 when the component 1 is joined to the connection expansion module 2. The connection expansion module 2 is secured to the component 1 by means of the screws 23, 24 so as to be releasable. For this purpose, corresponding threaded bores, into which the screws 23, 24 are screwed, can be provided on the component 1.

A strain relief for lines connectable to the four connections L, N, S1, S2 is not provided at the component 1. The connection expansion module 2 adds this function so that the component 1 can also be used or mounted at locations at which a strain relief is prescribed. The tensile force acting on the lines connected to the connection expansion module 2 is absorbed by the strain relief 20, designed as a clamp, and is diverted via the securing means 22 . . . 25 to the housing of the component 1, so that the lines can be prevented from tearing out of the connections 12 . . . 19, or the contact elements 7 . . . 10 can be prevented from tearing out of the connections L, N, S1, S2, up to a certain tensile force.

Figure 2:
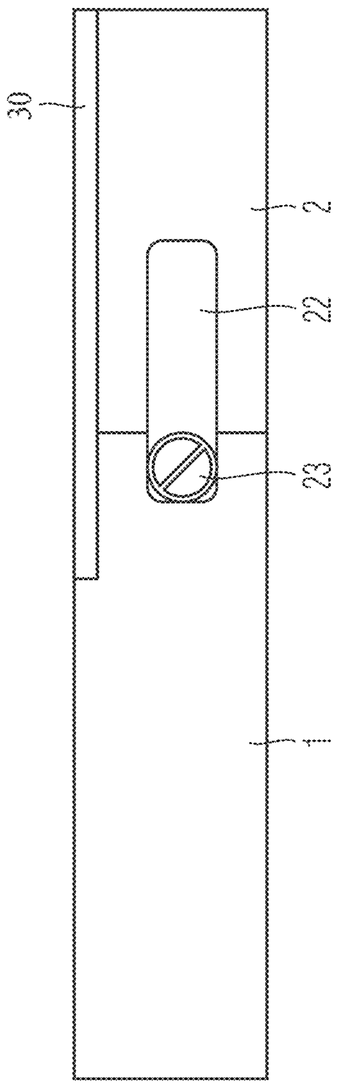

FIG. 2 shows a side view of the component 1 and of the connection expansion module 2 in the assembled state, with the cover 30 of the connection expansion module 2 screwed on. In the shown example, the cover 30 is designed such that it extends over the four connections L, N, S1, S2, is secured by means of screws (not shown) screwed into the threaded bores 3 . . . 6 and 26 . . . 29, and thus replaces the cover of the component 1. In addition to the function as contact protection for the circuit board 21 and the connections L, N, S1, S2 and 12 . . . 19, the cover 30 can also facilitate securing the connection expansion module to the component in addition to the securing means, so that the securing means 22 . . . 25 may be designed to be less stable or may be omitted.

The housing and/or the cover 30 of the connection expansion module 2 can be made of metal or be an injection-molded part made of plastic. In the described exemplary embodiment, all connections L, N, S1, S2 of the component 1 are duplicated by the connection expansion module 2. However, it is also possible to not duplicate all connections L, N, S1, S2 of the component 1, and to provide only one respective connection at the connection expansion module 2 for the connections S1, S2, for example, in order to reduce the space required for the connections 12 . . . 19 in the connection expansion module 2.

In particular given components 1, such as operating devices for light-emitting diodes, which have a plurality of functions and connections, in some applications lines are not connected to all connections L, N, S1, S2 of the component 1, so that no contact elements 7 . . . 10 and no connections 12 . . . 19 need to be present for the unpopulated connections L, N, S1, S2 in the connection expansion module 2, which reduces the space required for the connections 12 . . . 19. At least some of the connections L, N, S1, S2 and/or the connections 12 . . . 19 can alternatively also be designed as spring terminals.

In the described exemplary embodiment, the connections L, N, S1, S2 and the connections 12 . . . 19 are respectively arranged in a row. However, it is also possible to arrange at least some of the connections 12 . . . 19 in different planes/heights so that some of the lines connected to the connections 12 . . . 19 run one above the other, which enables a compact design. Securing the cover 30 and/or securing the connection expansion module 2 to the component 1 by means of the securing means 22 . . . 25 can take place with a different type of connection, in particular a positive-fit connection.

What is claimed is:

1. A connection expansion module (2) for a component (1) of a lighting system, having securing means (22 . . . 25) for securing the connection expansion module to the component, multiple contact elements (7 . . . 10) for contacting multiple electrical connections (L, N, S1, S2) of the component (1), and a plurality of connections (12 . . . 19) connected to the contact elements (7 . . . 10) for connecting electrical lines to the connection expansion module (2);

wherein at least two supply voltage contact elements (7, 8) are each designed to respectively contact one electrical connection (L, N) of the component (1) in order to supply voltage, and at least two of the connections (12, 14 and 13, 15) of the connection expansion module (2) are respectively electrically connected to each of two supply voltage contact elements (7, 8); and wherein at least two control signal contact elements (9, 10) are designed to respectively contact one electrical connection (S1, S2) of the component (1) for inputting and/or outputting a control signal, and at least two of the connections (16, 18 and 17, 19) of the connection expansion module (2) are respectively electrically connected to each of the two control signal contact elements (9, 10).

2. The connection expansion module (2) according to claim 1, wherein the securing means (22 . . . 25) is designed to secure the connection expansion module (2) to the component (1) so as to be releasable.

3. The connection expansion module (2) according to claim 1, having at least one cover (30) made of an electrically non-conductive material, which is designed to cover the contact element (7 . . . 10), the connections (12 . . . 19) of the connection expansion module (2), and/or the connections (L, N, S1, S2) of the component (1) secured to the connection expansion module (2).

4. The connection expansion module (2) according to claim 3, wherein the cover (30) facilitates securing the connection expansion module to the component in addition to the securing means.

5. The connection expansion module (2) according to claim 1, wherein each contact element (7 . . . 10) is designed to contact the electrical connection (L, N, S1, S2) of the component (1) by means of a clamping or screw connection.

6. The connection expansion module (2) according to claim 5, wherein each contact element (7 . . . 10) is a cylindrical pin, wire, or cable.

7. The connection expansion module (2) according to claim 1, having means (20) for strain relief for the electrical lines that can be connected to the connection expansion module (2).

8. A system comprising a connection expansion module (2) according to claim 1 and the component (1) of the lighting system, further wherein the securing means includes two screws attached to the guide rails on the connection expansion module and the component includes threaded bores into which the screws on the guide rails can be screwed to releasably attach the connection expansion module to the component.

9. The system according to claim 8, wherein the component (1) is an operating device for operating one or more LED illuminants, or a sensor.

* * * * *